Patented Feb. 16, 1943

2,311,283

UNITED STATES PATENT OFFICE 2,311,283

DINITRO ALKYL PHENOLS AND METHOD OF PREPARING THE SAME

Richard O. Roblin, Jr., Old Greenwich, Conn., assignor to American Cyanamid Company, New York, N. Y., a corporation of Maine No Drawing. Application December 14, 1940, Serial No. 370,135

5 Claims. (Cl. 260—622)

The present invention relates to the preparation of dinitro alkyl phenols and to certain of those compounds as new products.

It has been discovered that these compounds, and particularly the dinitro dialkyl phenols, where the alkyl groups contain at least two carbon atoms, are useful in combatting soft bodied insects and allied pests, being effective in killing citrus red spider in solutions as great as 1 to 160,000. Inasmuch, however, as all of the pure dinitro alkyl phenols are toxic in greater dilutions than the impure substances, it is desirable to devise methods of production thereof of maximum purity.

It has been discovered that in order to obtain the dinitrated tertiary alkyl phenols of maximum purity, the nitration of the initial starting material, to wit: a corresponding tertiary alkyl phenol, must be carried out under carefully controlled conditions of concentration of reagents, temperatures and times of reaction.

In carrying out one reaction, the phenol is first dissolved in a concentrated sulfuric acid. The use of a concentrated acid is desirable both from the standpoint that by its use external heat is not required and the production of deleterious by-products is prevented. For instance, if 95-98% sulfuric acid is used, the temperature of the reaction rises rapidly to approximately 70° C. without the necessity for applying external heat, and a clear solution is formed. When the evolution of heat has ceased, the mixture is then added to a small volume of water, resulting in a clear solution. On the contrary, the use of sulfuric acid of a concentration less than 90%, that is, 75%, even when heat is applied, results in an emulsion when the mixture is added to water. If such an emulsion is employed in the subsequent nitration, the reaction is difficult to control and the nitrated product contains from 10 to 20% of a tar insoluble in such solvents as 65% acetone in which the dinitro tertiary alkyl phenols are readily dissolved.

To the water solution of the sulfuric acid treatment, cooled to approximately 30° C., an excess of concentrated nitric acid (specific gravity 1.4) is added with agitation. Heat is again evolved and the temperature rises to 40 to 50° C. When the temperature begins to fall, external heat may be applied to maintain the temperature at between 80 and 95° C. for a period of between 1 and 3 hours. This treatment results in converting the material to the dinitro compounds. The resulting product, a dinitro tertiary alkyl phenol is of a high degree of purity and only requires washings with water to remove the inorganic acids and a centrifuging treatment to remove the water.

If a starting temperature on the nitric acid treatment higher than 30° C. is used, it has been found that lower yields result and there is a tendency to increase the impurities in the final product.

These dinitro tertiary alkyl phenols are soluble in most common organic solvents, such as acetone, ether, alcohol and benzene.

It has also been found that reaction products of these substances may be formed by replacing the hydrogen of the OH group with metals, ammonia and amines and that in many cases, these reaction products are as effective as insecticides as the dinitro tertiary alkyl phenols.

The ammonium and calcium reaction products which are typical, may be formed by simple reaction with ammonia and calcium hydroxide.

As an example of a method of preparing dinitro ortho tertiary amyl phenol, to 50 grams of concentrated sulfuric acid (specific gravity 1.835) is added 41 grams of ortho tertiary amyl phenol. Heat is generated spontaneously and the mixture should be stirred from 10 to 20 minutes. The product is then added to 300 grams of water and cooled to approximately 30° C. 100 grams of concentrated nitric acid (specific gravity 1.42) is then added, which causes a rise in temperature of about 50° C. At this point, the color of the solution changes from clear pink to cloudy yellow almost immediately.

After the initial temperature rise, the mixture may be heated and maintained at approximately 80 to 95° C. for from one to three hours with agitation. At the end of this period, the mixture is cooled to room temperature and the dinitro ortho tertiary amyl phenol separated in the form of a cloudy orange oil, heavier than the water layer. It may be purified by washing three times with water, the latter being removed from the compound by centrifuging. The resulting product, without further purification, checks on a nitrogen analysis for the compound $C_{11}H_{14}O_5N_2$. The boiling point of this substance ranges between 130 and 135° C. at 1 mm. pressure.

In a similar manner, dinitro para tertiary amyl phenol may be prepared from para tertiary amyl phenol. This compound is a yellow crystalline solid having a melting point of 66° C.

Similarly, other dinitro alkyl phenols such as the methyl, ethyl, propyl, butyl, hexyl, heptyl and higher homologs including their isomers, may be prepared.

In the preparation of mono amyl phenol from phenol and amyl alcohol, there is also formed some diamyl phenol. This consists of a mixture of isomers in which the amyl groups are primarily in the 2,6 and 2,4 positions. If crude amyl alcohol containing primary, secondary and tertiary amyl alcohol is employed, a much greater number of isomers results. It has been found that the isomeric mixture of diamyl phenols prepared from crude amyl alcohol and phenol which, for convenience, will be referred to as mixed diamyl phenols, can be nitrated according to the above method to yield dinitro compounds. In a similar manner, the other dinitro dialkyl phenols may be prepared, the amyl modification being referred to merely as an illustration of type.

These dinitro dialkyl phenols, where the alkyl groups contain at least two carbon atoms, have been found to possess desirable insecticidal properties as compared with dinitro dimethyl phenol, dinitro methyl propyl phenol, and the mono tertiary alkyl phenols, and in addition they have less tendency to burn or injure the host plant when applied for insecticidal purposes. Consequently, they may be used in much greater concentration. This is an important desideratum. As an example of a method of preparing a dinitro dialkyl phenol of the above type, the following is given as illustrative only.

To 50 grams of concentrated sulfuric acid is added 40 grams of mixed diamyl phenols. The mixture is stirred for from twenty to thirty minutes and then diluted with 300 cc. of water. Upon cooling to 25 to 35° C. and adding 100 grams of concentrated nitric acid, the temperature rises to approximately 50° C. The mixture may then be heated on a water bath at 85° C. for a period of from 1½ to 2 hours. Upon cooling, the dinitro product separates. It may be washed twice with water and dried by heating on a boiling water bath for approximately ½ hour in vacuo. The product obtained in this manner checks on a nitrogen analysis for the compound $C_{16}H_{24}O_5N_2$.

Other dinitro dialkyl phenols may be prepared by a similar method.

Actual experiments with such soft bodied insects as citrus red spider have shown that where the alkyl group is in the ortho position with respect to the hydroxyl, the most effective kills may be had. For instance, dinitro para tertiary amyl phenol is effective up to a dilution of 1 to 10,000, while with the amyl group in the ortho position, the dilution may be 1 to 160,000.

Both the dinitro ortho tertiary amyl phenols and its salts, particularly the ammonium and calcium salts have been found to be effective as ovicides in that adults did not develop from eggs of citrus red spider treated therewith, in dilutions of 1 to 10,000 as to salts and 1 to 20,000 as to the phenols themselves.

The dinitro para and ortho tertiary butyl phenols have been found to be particularly toxic to adult red spider, experiments indicating that 100% kill is obtainable on dilutions even as great as 1 to 40,000. A 91.8% kill was obtained in a dilution of 1 to 80,000, which demonstrates the unexpected effectiveness of these compounds.

Similarly, 100% kills of citrus red spider may be had at dilutions of from 1 to 5,000 to 1 to 40,000 with dinitro dialkyl phenols, where the alkyl groups contain at least two carbon atoms, amyl being preferred, and dinitro ortho normal alkyl phenol, the butyl form being particularly effective.

Tests comparing the insecticidal properties of dinitro dimethyl phenol and dinitro diethyl phenol as to toxicity against citrus red spider showed the following results:

*Dinitro dimethyl phenol*

| Dilution: | Percent dead |
|---|---|
| 1–500 | 100 |
| 1–1,000 | 99.2 |
| 1–2,000 | 98.8 |
| 1–5,000 | 77.8 |
| 1–20,000 | 50 |
| 1–40,000 | 20 |

*Dinitro diethyl phenol*

| 1–500 | 100 |
|---|---|
| 1–1,000 | 100 |
| 1–2,000 | 100 |
| 1–5,000 | 100 |
| 1–20,000 | 94.8 |
| 1–40,000 | 72.6 |

From the above, it will be seen that the dimethyl compound killed all of the red spiders on a one to 500 dilution but that the toxicity dropped off upon further dilution. The same tests with the diethyl compound showed a 100% toxicity to these insects in dilutions up to 1 to 5,000. In other words, the diethyl compound was ten times more effective than was the dimethyl substance.

These results demonstrate the rather remarkable fact that even at a dilution of 1 to 40,000, the toxicity of the diethyl dinitro phenol is substantially equal to that of the dimethyl compound in a dilution of 1 to 5,000 and this is characteristic of the dialkyl dinitro phenols where the alkyl groups contain at least two carbon atoms.

While the invention has been described with specific reference to particular embodiments, it is to be understood that it is not to be limited thereto but is to be construed broadly and restricted solely by the scope of the appended claims.

This application is a continuation in part of applicant's co-pending application Serial No. 147,254, now held in the abandoned files.

I claim:
1. A dinitro diamyl phenol.
2. A method of preparing a dinitro dialkyl phenol which comprises mixing sulfuric acid of a concentration greater than 90% with a dialkyl phenol, adding the product to water, cooling the reaction product, nitrating the water solution with nitric acid having a specific gravity of not less than 1.4, maintaining the mix at from 80 to 95° C. for from one to three hours, cooling the product to room temperature, and separating out the dinitro dialkyl phenol.
3. The method of claim 2 in which the dialkyl phenol is a mixture of primary, secondary and tertiary isomers.
4. The method of claim 2 in which the dialkyl phenol is a mixture of primary, secondary and tertiary diamyl phenols.
5. A method of preparing a dinitro diamyl phenol which comprises reacting the mixture obtained by the interaction of crude amyl alcohol and phenol to obtain a mixture of primary, secondary and tertiary diamyl phenols, with sulfuric acid of a concentration greater than 90%, adding the product to water, cooling, nitrating the water solution with nitric acid having a specific gravity of not less than 1.4, maintaining the mix at from 80 to 95° C., for from one to three hours, cooling the product and separating out the dinitro diamyl phenol.

RICHARD O. ROBLIN, Jr.

CERTIFICATE OF CORRECTION.

Patent No. 2,311,283.   February 16, 1943.

RICHARD O. ROBLIN, JR.

It is hereby certified that error appears in the printed specification of the above numbered patent requiring correction as follows: Page 1, second column, line 31, for "of" before "about" read --to--; and that the said Letters Patent should be read with this correction therein that the same may conform to the record of the case in the Patent Office.

Signed and sealed this 13th day of April, A. D. 1943.

(Seal)

Henry Van Arsdale,
Acting Commissioner of Patents.